United States Patent
Lee et al.

(10) Patent No.: US 10,822,493 B2
(45) Date of Patent: Nov. 3, 2020

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Woo Jin Lee, Uiwang-si (KR); Sun Young Kim, Uiwang-si (KR); Eun Taek Woo, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 76 days.

(21) Appl. No.: 16/232,362

(22) Filed: Dec. 26, 2018

(65) Prior Publication Data

US 2019/0203040 A1 Jul. 4, 2019

(30) Foreign Application Priority Data

Dec. 29, 2017 (KR) .......................... 10-2017-0184703

(51) Int. Cl.
| | |
|---|---|
| *C08L 69/00* | (2006.01) |
| *B29C 45/00* | (2006.01) |
| *B29B 9/16* | (2006.01) |
| *B29B 7/00* | (2006.01) |
| *B29B 9/06* | (2006.01) |
| *B29K 69/00* | (2006.01) |
| *B29B 7/46* | (2006.01) |

(52) U.S. Cl.
CPC .............. *C08L 69/00* (2013.01); *B29B 7/007* (2013.01); *B29B 9/16* (2013.01); *B29C 45/0001* (2013.01); *B29B 7/46* (2013.01); *B29B 9/06* (2013.01); *B29K 2069/00* (2013.01); *C08L 2201/02* (2013.01); *C08L 2205/025* (2013.01); *C08L 2205/03* (2013.01); *C08L 2205/035* (2013.01); *C08L 2207/53* (2013.01)

(58) Field of Classification Search
CPC ........... B29B 7/007; B29B 7/46; B29B 9/016; B29B 9/06; C08L 69/00; C08L 2205/025; C08L 2205/03; C08L 2205/035; C08L 2207/53; B29C 45/0001; B29K 2069/00
See application file for complete search history.

(56) References Cited

U.S. PATENT DOCUMENTS

| | | | | |
|---|---|---|---|---|
| 6,362,269 B1 * | 3/2002 | Ishihata | ............... | C08K 7/00 524/449 |
| 8,916,632 B2 | 12/2014 | Choi et al. | | |
| 2006/0106162 A1 * | 5/2006 | Yamaguchi | ............. | C08L 67/04 525/63 |
| 2007/0060716 A1 * | 3/2007 | Ambravaneswaran | ...................... | C08L 2666/02 525/464 |
| 2014/0187690 A1 * | 7/2014 | Choi | ....................... | C08L 69/00 524/127 |

FOREIGN PATENT DOCUMENTS

| | | |
|---|---|---|
| KR | 10-2010-0077648 A | 7/2010 |
| KR | 10-1508762 B1 | 4/2015 |

OTHER PUBLICATIONS

Office Action in counterpart Korean Application No. 10-2017-0184703 dated Jan. 25, 2019, pp. 1-5.

* cited by examiner

*Primary Examiner* — Christopher M Rodd
(74) *Attorney, Agent, or Firm* — Additon, Higgins & Pendleton, P.A.

(57) ABSTRACT

Disclosed herein is a thermoplastic resin composition. The thermoplastic resin composition includes: about 100 parts by weight of a polycarbonate resin; about 1 part by weight to about 30 parts by weight of a core-shell type rubber-modified vinyl graft copolymer; about 5 parts by weight to about 50 parts by weight of an aromatic vinyl copolymer resin; and about 5 parts by weight to about 50 parts by weight of a phosphorus flame retardant, wherein the polycarbonate resin includes a first polycarbonate resin having a weight average molecular weight of about 10,000 g/mol to about 30,000 g/mol and a second polycarbonate resin having a weight average molecular weight of about 35,000 g/mol to about 60,000 g/mol, and the core-shell type rubber-modified vinyl graft copolymer is obtained by grafting an alkyl (meth)acrylate monomer to a rubber polymer. The thermoplastic resin composition can have good properties in terms of chemical resistance, impact resistance, flame retardancy, heat resistance, and/or fluidity.

9 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application No. 10-2017-0184703, filed Dec. 29, 2017, the entire disclosure of which is incorporated herein by reference.

FIELD

The present disclosure relates to a thermoplastic resin composition and a molded article formed of the same.

BACKGROUND

A blend of a polycarbonate resin and an aromatic vinyl copolymer resin can have good properties in terms of impact resistance, flame retardancy, heat resistance, and processability and is thus used in the manufacture of large injection molded products generating a lot of heat, such as computer housings and office equipment.

However, mechanical properties and/or flame retardancy of polycarbonate resins can deteriorate under alkali or metal ion-rich conditions or high humidity conditions, which can limit use of such polycarbonate resins in various applications.

A phosphorus flame retardant can be used to impart flame retardancy to a resin composition. Adding a flame retardant to a resin composition can, however, deteriorate chemical resistance and mechanical properties of the resin composition.

Polyester resin can be added to improve chemical resistance of a resin composition. This method, however, is not suitable for preventing deterioration in flame retardancy and mechanical properties of the resin composition.

Therefore, there is a need for a thermoplastic resin composition which has good properties in terms of chemical resistance, impact resistance, flame retardancy, heat resistance, and/or fluidity.

SUMMARY OF THE INVENTION

The present disclosure relates to a thermoplastic resin composition which can have good properties in terms of chemical resistance, impact resistance, flame retardancy, heat resistance, and/or fluidity, and a molded article formed of the same.

The thermoplastic resin composition includes: about 100 parts by weight of a polycarbonate resin; about 1 part by weight to about 30 parts by weight of a core-shell type rubber-modified vinyl graft copolymer; about 5 parts by weight to about 50 parts by weight of an aromatic vinyl copolymer resin; and about 5 parts by weight to about 50 parts by weight of a phosphorus flame retardant, wherein the polycarbonate resin includes a first polycarbonate resin having a weight average molecular weight of about 10,000 g/mol to about 30,000 g/mol and a second polycarbonate resin having a weight average molecular weight of about 35,000 g/mol to about 60,000 g/mol, and the core-shell type rubber-modified vinyl graft copolymer is obtained by grafting an alkyl (meth)acrylate monomer to a rubber polymer.

The polycarbonate resin may include about 10 wt % to about 90 wt % of the first polycarbonate resin and about 10 wt % to about 90 wt % of the second polycarbonate resin.

The core-shell type rubber-modified vinyl graft copolymer may be obtained by grafting a monomer mixture comprising the alkyl (meth)acrylate monomer and an aromatic vinyl monomer to the rubber polymer.

The aromatic vinyl copolymer resin may be a polymer of a monomer mixture including an aromatic vinyl monomer and a vinyl cyanide monomer.

The aromatic vinyl copolymer resin may have a weight average molecular weight of about 10,000 g/mol to about 300,000 g/mol.

The phosphorus flame retardant may include a phosphate compound, a phosphonate compound, a phosphinate compound, a phosphine oxide compound, and/or a phosphazene compound.

The thermoplastic resin composition may further include a polyester resin.

The thermoplastic resin composition may have a notched Izod impact strength of about 10 kgf·cm/cm to about 70 kgf·cm/cm, as measured on a ⅛" thick specimen in accordance with ASTM D256.

The thermoplastic resin composition may have a flame retardancy of 5VB, as measured on a 1.5 mm thick specimen by the UL-94 vertical burning test.

The thermoplastic resin composition may have a Vicat softening temperature of about 90° C. to about 120° C., as measured at a heating rate of 50° C./hr under a load of 5 kg in accordance with ISO R306.

The thermoplastic resin composition may have a spiral flow length of about 160 mm to about 250 mm, as measured on a specimen prepared by subjecting the thermoplastic resin composition to injection molding in a 2 mm thick spiral mold under conditions of a molding temperature of 300° C., a mold temperature of 80° C., an injection pressure of 1,500 kg/cm$^2$, and an injection rate of 120 mm/s.

The present disclosure also relates to a molded article. The molded article is formed of the thermoplastic resin composition set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure includes: (A) a polycarbonate resin; (B) a core-shell type rubber-modified vinyl graft copolymer; (C) an aromatic vinyl copolymer resin; and (D) a phosphorus flame retardant.

(A) Polycarbonate Resin

The polycarbonate resin according to the present disclosure is obtained by mixing two types of polycarbonate resins having different weight average molecular weights so as to improve the chemical resistance, flame retardancy and/or fluidity of the thermoplastic resin composition. For example, the polycarbonate resin includes a first polycarbonate resin having a weight average molecular weight of about 10,000 g/mol to about 30,000 g/mol, for example, about 15,000 g/mol to about 29,000 g/mol, as measured by gel permeation chromatography (GPC) and a second polycarbonate resin having a weight average molecular weight of about 35,000 g/mol to about 60,000 g/mol, for example about 36,000 g/mol to about 50,000 g/mol, as measured by GPC.

If the weight average molecular weight of the first polycarbonate resin is less than about 10,000 g/mol, the thermoplastic resin composition can have poor properties in terms of chemical resistance, flame retardancy, and/or impact resistance, whereas, if the weight average molecular weight of the second polycarbonate resin exceeds about 60,000 g/mol, the thermoplastic resin composition can have poor fluidity.

In addition, a difference in weight average molecular weight between the first polycarbonate resin and the second polycarbonate resin may be about 5,000 g/mol or more, for example, about 7,000 g/mol to about 35,000 g/mol. If the difference in weight average molecular weight between the first polycarbonate resin and the second polycarbonate resin is less than about 5,000 g/mol, the thermoplastic resin composition can have poor properties in terms of flame retardancy, chemical resistance, and/or fluidity. If the difference in weight average molecular weight between the first polycarbonate resin and the second polycarbonate resin is more than about 35,000 g/mol, the thermoplastic resin composition can have poor properties in terms of flame retardancy, chemical resistance, and/or fluidity.

Each of the first and second polycarbonate resins may include any typical thermoplastic polycarbonate resin having a weight average molecular weight falling within the above range, and may be, for example, an aromatic polycarbonate resin prepared by reacting diphenol(s) (aromatic dihydroxy compounds) with a carbonate precursor such as phosgene, halogen formate, and/or carbonate diester.

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis-(4-hydroxyphenyl) propane, 2,2-bis(3,5-dichloro-4-hydroxyphenyl)propane, 2,2-bis(3-methyl-4-hydroxyphenyl)propane, and/or 1,1-bis(4-hydroxyphenyl)cyclohexane, for example 2,2-bis-(4-hydroxyphenyl)propane, which is also referred to as bisphenol A.

Each of the first and second polycarbonate resins may be a branched polycarbonate resin. For example, each of the first and second polycarbonate resins may be a polycarbonate resin prepared by adding about 0.05 mol % to about 2 mol % of a tri- or higher polyfunctional compound, for example, a tri- or higher valent phenol group-containing compound based on the total number of moles of the diphenols used in polymerization.

The first polycarbonate resin may be present in an amount of about 10% by weight (wt %) to about 90 wt %, for example, about 10 wt % to about 60 wt %, and as another example about 15 wt % to about 40 wt %, based on the total weight (100 wt %) of the polycarbonate resin (A), and the second polycarbonate resin may be present in an amount of about 10 wt % to about 90 wt %, for example, about 40 wt % to about 90 wt %, and as another example about 60 wt % to about 85 wt %, based on the total weight (100 wt %) of the polycarbonate resin (A).

In some embodiments, the polycarbonate resin (A) can include the first polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on the total weight (100 wt %) of the polycarbonate resin (A). Further, according to some embodiments, the first polycarbonate resin can be present in an amount of from about any of the foregoing amounts to about any other of the foregoing amounts.

In some embodiments, the polycarbonate resin (A) can include the second polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on the total weight (100 wt %) of the polycarbonate resin (A), Further, according to some embodiments, the second polycarbonate resin can be present in an amount of from about any of the foregoing amounts to about any other of the foregoing amounts.

Within these ranges, the thermoplastic resin composition can have good properties in terms of impact resistance, chemical resistance (oil resistance), flame retardancy, fluidity, and/or a balance therebetween.

(B) Core-Shell Type Rubber-Modified Vinyl Graft Copolymer

The core-shell type rubber-modified vinyl graft copolymer according to the present disclosure serves to improve the chemical resistance (oil resistance), impact resistance, and/or appearance characteristics of the thermoplastic resin composition and may be prepared by grafting an alkyl(meth)acrylate monomer and/or a monomer mixture including the alkyl(meth)acrylate monomer and an aromatic vinyl monomer to a rubber polymer. For example, the core-shell type rubber-modified vinyl graft copolymer may be obtained by graft-polymerization of the alkyl(meth)acrylate monomer and/or the monomer mixture including the alkyl(meth)acrylate monomer and the aromatic vinyl monomer with the rubber polymer. Here, graft-polymerization may be carried out by any known polymerization method such as emulsion polymerization and/or suspension polymerization. In addition, the core-shell type rubber-modified vinyl graft copolymer has a core-shell structure, wherein the core is composed of the rubber polymer and the shell is composed of a polymer of the alkyl (meth)acrylate monomer and/or the monomer mixture.

Examples of the rubber polymer may include without limitation: diene rubbers such as polybutadiene, poly(styrene-butadiene), and/or poly(acrylonitrile-butadiene); saturated rubbers obtained by adding hydrogen to the diene rubbers; isoprene rubbers; $C_2$ to $C_{10}$ alkyl (meth)acrylate rubbers; $C_2$ to $C_{10}$ alkyl (meth)acrylate-styrene copolymers; and/or an ethylene-propylene-diene monomer terpolymer (EPDM). These may be used alone or as a mixture thereof. For example, the rubber polymer may be a diene rubber and/or a (meth)acrylate rubber, for example butadiene rubber, butyl acrylate rubber, ethyl acrylate rubber, or a combination thereof.

The rubber polymer (rubber particles) may have an average particle size (D50) of about 0.05 µm to about 6 µm, for example, about 0.15 µm to about 4 µm, and as another example about 0.25 µm to about 3.5 µm, as measured using a particle size analyzer. Within this range, the thermoplastic resin composition can have good properties in terms of impact resistance and/or appearance characteristics. Here, the average particle size was determined using a Mastersizer 2000E particle size analyzer (Malvern Instruments) instrument by a dry method known in the art.

The rubber polymer may be present in an amount of about 10 wt % to about 70 wt %, for example, about 20 wt % to about 60 wt %, based on the total weight (100 wt %) of the core-shell type rubber-modified vinyl graft copolymer, and the alkyl (meth)acrylate monomer and/or the monomer mixture may be present in an amount of about 30 wt % to about 90 wt %, for example, about 40 wt % to about 80 wt %, based on the total weight (100 wt %) of the core-shell type rubber-modified vinyl graft copolymer.

In some embodiments, the core-shell type rubber-modified vinyl graft copolymer can include the rubber polymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % based on the total weight (100 wt %) of the core-shell type rubber-modified vinyl graft copolymer. Further, according to some embodiments, the rubber polymer can be present in an amount of from about any of the foregoing amounts to about any other of the foregoing amounts.

In some embodiments, the core-shell type rubber-modified vinyl graft copolymer can include the alkyl (meth)acrylate monomer and/or the monomer mixture in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on the total weight (100 wt %) of the core-shell type rubber-modified vinyl graft copolymer. Further, according to some embodiments, the alkyl (meth) acrylate monomer and/or the monomer mixture can be present in an amount of from about any of the foregoing amounts to about any other of the foregoing amounts.

Within these ranges, the thermoplastic resin composition can have good properties in terms of impact resistance and/or chemical resistance.

The alkyl (meth) acrylate monomer is a monomer which is graft-polymerizable with the rubber polymer and copolymerizable with the aromatic vinyl monomer and examples thereof may include without limitation methyl (meth)acrylate, ethyl (meth)acrylate, propyl (meth)acrylate, and/or butyl (meth)acrylate. These may be used alone or as a mixture thereof.

In some embodiments, only the alkyl (meth)acrylate monomer may be used as the shell component.

When the monomer mixture is used as the shell component, the alkyl(meth)acrylate monomer may be present in an amount of about 6 wt % to about 85 wt %, for example, about 20 wt % to about 80 wt %, and as another example about 40 wt % to about 70 wt %, based on the total weight (100 wt %) of the monomer mixture.

In some embodiments, the monomer mixture can include the alkyl(meth)acrylate monomer in an amount of about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt % based on the total weight (100 wt %) of the monomer mixture. Further, according to some embodiments, the alkyl (meth)acrylate monomer can be present in an amount of from about any of the foregoing amounts to about any other of the foregoing amounts.

Within this range, the thermoplastic resin composition can have good properties in terms of chemical resistance and appearance characteristics.

The aromatic vinyl monomer is a monomer which is graft-polymerizable with the rubber polymer, and examples thereof may include without limitation styrene, α-methylstyrene, β-methylstyrene, p-methylstyrene, p-t-butylstyrene, ethylstyrene, vinylxylene, monochlorostyrene, dichlorostyrene, dibromostyrene, and/or vinyl naphthalene. These may be used alone or as a mixture thereof.

The aromatic vinyl monomer may be present in an amount of about 15 wt % to about 94 wt %, for example, about 20 wt % to about 80 wt %, and as another example about 30 wt % to about 60 wt %, based on the total weight (100 wt %) of the monomer mixture.

In some embodiments, the monomer mixture can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt % based on the total weight (100 wt %) of the monomer mixture. Further, according to some embodiments, the aromatic vinyl monomer can be present in an amount of from about any of the foregoing amounts to about any other of the foregoing amounts.

Within this range, the thermoplastic resin composition can have good impact resistance.

The core-shell type rubber-modified vinyl graft copolymer may be, for example, a graft copolymer obtained by grafting methyl methacrylate to a butadiene rubber polymer and/or a graft copolymer obtained by grafting methyl methacrylate and styrene to a butadiene rubber polymer.

The thermoplastic resin composition can include the core-shell type rubber-modified vinyl graft copolymer in an amount of about 1 part by weight to about 30 parts by weight, for example, about 5 parts by weight to about 25 parts by weight, relative to about 100 parts by weight of the polycarbonate resin. In some embodiments, the thermoplastic resin composition can include the core-shell type rubber-modified vinyl graft copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight relative to about 100 parts by weight of the polycarbonate resin. Further, according to some embodiments, the core-shell type rubber-modified vinyl graft copolymer can be present in an amount of from about any of the foregoing amounts to about any other of the foregoing amounts.

If the amount of the core-shell type rubber-modified vinyl graft copolymer is less than about 1 part by weight relative to about 100 parts by weight of the polycarbonate resin, the thermoplastic resin composition can have poor properties in terms of chemical resistance and/or impact resistance, whereas, if the amount of the core-shell type rubber-modified vinyl graft copolymer exceeds about 30 parts by weight, the thermoplastic resin composition can have poor properties in terms of flame retardancy and/or appearance characteristics.

(C) Aromatic Vinyl Copolymer Resin

The aromatic vinyl copolymer resin according to the present disclosure may be a polymer of a monomer mixture including an aromatic vinyl monomer and a vinyl cyanide monomer. For example, the aromatic vinyl copolymer resin may be prepared by mixing an aromatic vinyl monomer with a vinyl cyanide monomer, followed by polymerization, wherein polymerization may be carried out by any known polymerization method such as emulsion polymerization, suspension polymerization, and/or mass polymerization.

Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, and/or vinyl naphthalene. These may be used alone or as a mixture thereof.

The aromatic vinyl monomer may be present in an amount of about 20 wt % to about 90 wt %, for example, about 30 wt % to about 80 wt %, based on the total weight (100 wt %) of the aromatic vinyl copolymer resin. In some embodiments, the aromatic vinyl copolymer resin can include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on the total weight (100 wt %) of the aromatic vinyl copolymer resin. Further, according to some embodiments, the aromatic vinyl monomer can be present in an amount of from about any of the foregoing amounts to about any other of the foregoing amounts.

Within this range, the thermoplastic resin composition can have good properties in terms of impact resistance and/or fluidity.

Examples of the vinyl cyanide monomer may include without limitation acrylonitrile, methacrylonitrile, ethacrylonitrile, phenyl acrylonitrile, α-chloroacrylonitrile, and/or fumaronitrile. These may be used alone or as a mixture thereof. For example, the vinyl cyanide monomer may be acrylonitrile and/or methacrylonitrile.

The vinyl cyanide monomer may be present in an amount of about 10 wt % to about 80 wt %, for example, about 20 wt % to about 70 wt %, based on the total weight (100 wt %) of the aromatic vinyl copolymer resin. In some embodiments, the aromatic vinyl copolymer resin can include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt % based on the total weight (100 wt %) of the aromatic vinyl copolymer resin. Further, according to some embodiments, the vinyl cyanide monomer can be present in an amount of from about any of the foregoing amounts to about any other of the foregoing amounts.

Within this range, the thermoplastic resin composition can have good properties in terms of impact resistance and/or fluidity.

The aromatic vinyl copolymer resin may further optionally include a monomer for imparting processability and heat resistance. Examples of the monomer imparting processability and heat resistance may include (meth)acrylic acid, an ester thereof, maleic anhydride, and/or N-substituted maleimide, without being limited thereto.

The monomer for imparting processability and heat resistance may be present in an amount of about 15 wt % or less, for example, about 0.1 wt % to about 10 wt %, based on the total weight (100 wt %) of the aromatic vinyl copolymer resin. In some embodiments, the aromatic vinyl copolymer resin can include the monomer for imparting processability and heat resistance in an amount of 0 (the monomer for imparting processability and heat resistance is not present), about 0 (the monomer for imparting processability and heat resistance is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt % based on the total weight (100 wt %) of the aromatic vinyl copolymer resin. Further, according to some embodiments, the monomer for imparting processability and heat resistance can be present in an amount of from about any of the foregoing amounts to about any other of the foregoing amounts.

Within this range, the monomer can impart processability and heat resistance to the thermoplastic resin composition with minimal or no deterioration in other properties.

The aromatic vinyl copolymer resin may have a weight average molecular weight (Mw) of about 10,000 g/mol to about 300,000 g/mol, for example, about 60,000 g/mol to about 200,000 g/mol, as measured by gel permeation chromatography (GPC). Within this range, the thermoplastic resin composition can have good properties in terms of impact resistance and/or fluidity.

The thermoplastic resin composition can include the aromatic vinyl copolymer resin in an amount of about 5 parts by weight to about 50 parts by weight, for example, about 20 parts by weight to about 40 parts by weight, relative to about 100 parts by weight of the polycarbonate resin. In some embodiments, the thermoplastic resin composition can include the aromatic vinyl copolymer resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight relative to about 100 parts by weight of the polycarbonate resin. Further, according to some embodiments, the aromatic vinyl copolymer resin can be present in an amount of from about any of the foregoing amounts to about any other of the foregoing amounts.

If the amount of the aromatic vinyl copolymer resin is less than about 5 parts by weight relative to about 100 parts by weight of the polycarbonate resin, the thermoplastic resin composition can have poor properties in terms of fluidity and/or chemical resistance, whereas, if the amount of the aromatic vinyl copolymer resin exceeds about 50 parts by weight, the thermoplastic resin composition can have poor properties in terms of flame retardancy and/or impact resistance.

A weight ratio of the core-shell type rubber-modified vinyl graft copolymer (B) to the aromatic vinyl copolymer resin (C) ((B):(C)) may range from about 1:1 to about 1:3, for example, about 1:1.5 to about 1:2.5. In some embodiments, the weight ratio of the core-shell type rubber-modified vinyl graft copolymer (B) to the aromatic vinyl copolymer resin (C) ((B):(C)) can be about 1:1, 1:1.5, 1:2, 1:2.5, or 1:3. Within this range, the thermoplastic resin composition can have good properties in terms of chemical resistance, impact resistance, fluidity, appearance characteristics, flame retardancy, and/or a balance therebetween.

(D) Phosphorus Flame Retardant

The phosphorus flame retardant according to the present disclosure may include any typical phosphorus flame retardant used in thermoplastic resin compositions. Examples of the phosphorus flame retardant may include without limitation a phosphate compound, a phosphonate compound, a phosphinate compound, a phosphine oxide compound, a phosphazene compound, and/or a metal salt thereof. These compounds may be used alone or as a mixture thereof.

In one embodiment, the phosphorus flame retardant may include an aromatic phosphoric ester (phosphate) compound represented by Formula 1:

[Formula 1]

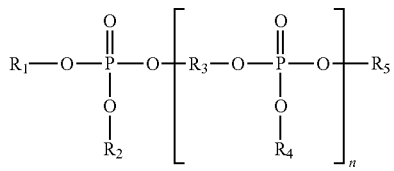

wherein in Formula 1, $R_1$, $R_2$, $R_4$ and $R_5$ are the same or different and are each independently a hydrogen atom, a $C_6$ to $C_{20}$ aryl group, or a $C_1$ to $C_{10}$ alkyl-substituted $C_6$ to $C_{20}$ aryl group; $R_3$ is a $C_6$ to $C_{20}$ arylene group or a $C_1$ to $C_{10}$ alkyl-substituted $C_6$ to $C_{20}$ arylene group, for example, derivatives of dialcohol, such as resorcinol, hydroquinone, bisphenol-A, or bisphenol-S; and n is an integer from 0 to 10, for example, 0 to 4.

When n is 0 in Formula 3, examples of the aromatic phosphoric ester compound represented by Formula 2 may include without limitation diaryl phosphate such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate. In addition, when n is 1 in Formula 3, examples of the compound may include without limitation bisphenol-A bis(diphenyl phosphate), resorcinol bis(diphenyl phosphate), resorcinol bis[bis(2,6-dimethylphenyl) phosphate], resorcinol bis[bis(2,4-di-tert-butylphenyl) phosphate], hydroquinone bis[bis(2,6-dimethylphenyl) phosphate], and hydroquinone bis[bis(2,4-di-tert-butylphenyl) phosphate]. When n is 2 or greater in Formula 3, examples of the compound may include oligomer-type phosphoric ester compounds, without being limited thereto. These compounds may be used alone or as a mixture thereof.

The thermoplastic resin composition can include the phosphorus flame retardant in an amount of about 5 parts by weight to about 50 parts by weight, for example, about 20 parts by weight to about 40 parts by weight, relative to about 100 parts by weight of the polycarbonate resin. In some embodiments, the thermoplastic resin composition can include the phosphorus flame retardant in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight relative to about 100 parts by weight of the polycarbonate resin. Further, according to some embodiments, the phosphorus flame retardant can be present in an amount of from about any of the foregoing amounts to about any other of the foregoing amounts.

If the amount of the phosphorus flame retardant is less than about 5 parts by weight based on about 100 parts by weight of the polycarbonate resin, the thermoplastic resin composition can have poor properties in terms of flame retardancy and/or fluidity, whereas, if the amount of the phosphorus flame retardant exceeds about 50 parts by weight, the thermoplastic resin composition can have good properties in terms of impact resistance, chemical resistance, and/or heat resistance.

In one embodiment, the thermoplastic resin composition may further include a polyester resin so as to further improve chemical resistance (oil resistance) of the resin composition.

The polyester resin may be obtained by polycondensation of a dicarboxylic acid component and a diol component, wherein the dicarboxylic acid component may include: aromatic dicarboxylic acids such as terephthalic acid (TPA), isophthalic acid (IPA), 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and/or 2,7-naphthalenedicarboxylic acid; and/or aromatic dicarboxylates such as dimethyl terephthalate (DMT), dimethyl isophthalate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, and/or dimethyl-2,7-naphthalate and the diol component may include ethylene glycol, 1,2-propylene glycol, 1,3-propylene glycol, 2,2-diethyl-1,3-propane diol, 1,3-butane diol, 1,4-butane diol, 1,5-pentane diol, and/or 1,6-hexane diol, without being limited thereto.

The polyester resin may include polyethylene terephthalate (PET), polybutylene terephthalate (PBT), polyethylene naphthalate (PEN), and/or polytrimethylene terephthalate (PTT).

The polyester resin may have an intrinsic viscosity of about 0.4 to about 1.5 dl/g, as measured at 35° C. using an o-chlorophenol solution (o-chlorophenol concentration: 0.5 g/dl).

The thermoplastic resin composition can include the polyester resin in an amount of about 30 parts by weight or less, for example, about 0.1 parts by weight to about 10 parts by weight, relative to about 100 parts by weight of the polycarbonate resin. In some embodiments, the thermoplastic resin composition can include the polyester resin in an amount of 0 (the polyester resin is not present), about 0 (the polyester resin is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight relative to about 100 parts by weight of the polycarbonate resin. Further, according to some embodiments, the polyester resin can be present in an amount of from about any of the foregoing amounts to about any other of the foregoing amounts.

Within this range, the thermoplastic resin composition can have good properties in terms of chemical resistance (oil resistance), impact resistance, and/or flame retardancy.

The thermoplastic resin composition may further include one or more of any typical additive used in thermoplastic resin compositions. Examples of the additive may include without limitation an anti-dripping agent, fillers, an antioxidant, a lubricant, a release agent, a nucleating agent, a stabilizer, a pigment, a dye, and a mixture thereof. The additive may be present in an amount of about 0.001 parts by weight to about 40 parts by weight, for example, about 0.1 parts by weight to about 10 parts by weight, relative to about 100 parts by weight of the thermoplastic resin composition.

The thermoplastic resin composition according to the present invention may be prepared in pellet form by mixing the aforementioned components, followed by melt extrusion at a temperature of about 200° C. to about 280° C., for example, about 220° C. to about 250° C. using a typical twin screw extruder.

The thermoplastic resin composition may have a notched Izod impact strength of about 10 kgf·cm/cm to about 70 kgf·cm/cm, for example, about 40 kgf·cm/cm to about 65 kgf·cm/cm, as measured on a ⅛" thick specimen in accordance with ASTM D256.

The thermoplastic resin composition may have a flame retardancy of 5VB, as measured on a 1.5 mm thick specimen in accordance with the UL-94 vertical burning test.

The thermoplastic resin composition may have a Vicat softening temperature of about 90° C. to about 120° C., for example about 93° C. to about 110° C., as measured at a heating rate of 50° C./hr under a load of 5 kg in accordance with ISO R306.

The thermoplastic resin composition may have a spiral flow length of about 160 mm to about 250 mm, for example, about 160 mm to about 200 mm, as measured on a specimen prepared by subjecting the thermoplastic resin composition to injection molding in a 2 mm thick spiral mold under conditions of a molding temperature of 300° C., a mold temperature of 80° C., an injection pressure of 1,500 kg/cm$^2$, and an injection rate of 120 mm/s.

The present disclosure also relates to a molded article formed of the thermoplastic resin composition set forth above. The thermoplastic resin composition may be prepared in pellet form. The prepared pellets may be produced into various molded articles (products) by various molding methods such as injection molding, extrusion, vacuum molding, and casting. Such molding methods are well known to those skilled in the art. The molded article can have good properties in terms of chemical resistance, impact resistance, flame retardancy, heat resistance, and/or fluidity and thus can be useful in the manufacture of an exterior material for electric/electronic products and/or an exterior material for office equipment, without limitation.

Next, the present invention will be described in more detail with reference to the following examples. It should be understood that these examples are provided for illustration only and are not to be in any way construed as limiting the present invention.

EXAMPLES

Details of components used in Examples and Comparative Examples are as follows:

(A) Polycarbonate Resin (A1) A bisphenol-A polycarbonate resin having a weight average molecular weight (Mw) of 25,000 g/mol (Lotte Advanced Materials)

(A2) A bisphenol-A polycarbonate resin having a weight average molecular weight (Mw) of 40,000 g/mol (K1300, TEIJIN Kasei Co., Ltd.)

(A3) A bisphenol-A polycarbonate resin having a weight average molecular weight (Mw) of 32,000 g/mol (Lotte Advanced Materials)

(B) Core-Shell Type Rubber-Modified Vinyl Graft Copolymer (B1) A core-shell type rubber-modified vinyl graft copolymer obtained by grafting methyl methacrylate to butadiene/ethyl acrylate rubber (core, average particle size: 310 nm) to form a shell (EXL-2602, Kureha Chemical Co., Ltd.)

(B2) A g-ABS resin obtained by grafting 55 wt % of styrene and acrylonitrile (weight ratio: 75/25) to 45 wt % of butadiene rubber (core, average particle size: 310 nm)

(C) Aromatic Vinyl Copolymer Resin

SAN obtained by polymerization of 75 wt % of styrene with 25 wt % of acrylonitrile (weight average molecular weight: 130,000 g/mol)

(D) Phosphorus Flame Retardant

Bisphenol-A diphosphate (BDP, Yoke Chemical)

(E) Polyester Resin

A polyethylene terephthalate (PET) resin (BCN76, Lotte Chemical Corporation)

Examples 1 to 6 and Comparative Examples 1 to 6

The aforementioned components are mixed in amounts as listed in Tables 1 and 2, followed by extrusion at 230° C., thereby preparing a thermoplastic resin composition in pellet form. Here, extrusion is performed using a twin-screw extruder (L/D: 36, Φ: 45 mm). The prepared pellets are dried at 80° C. for 2 hours or more and then subjected to injection molding using a 6 oz. injection machine (molding temperature of 230° C., a mold temperature: 60° C.), thereby preparing a specimen. The prepared specimen is evaluated as to the following properties. Results are shown in Tables 1 and 2.

Property Evaluation (1) Impact resistance: Notched Izod impact strength (unit: kgf·cm/cm) is measured on a ⅛" thick Izod specimen (prepared by injection molding using a 6 oz injection machine with a molding temperature of 230° C. and a mold temperature of 60° C. as noted above) in accordance with ASTM D256.

(2) Flame retardancy: Flame retardancy is measured on a 1.5 mm thick specimen (prepared by injection molding using a 6 oz injection machine with a molding temperature of 230° C. and a mold temperature of 60° C. as noted above) in accordance with the UL-94 vertical burning test.

(3) Heat resistance: Vicat softening temperature (VST) (unit: ° C.) is measured at a heating rate of 50° C./hr under a load of 5 kg in accordance with ISO R306.

(4) Fluidity: Spiral flow length (unit: mm) is measured on a specimen prepared by subjecting the prepared pellets to injection molding in a 2 mm thick spiral mold under conditions of a molding temperature of 300° C., a mold temperature of 80° C., an injection pressure of 1,500 kg/cm$^2$, and an injection rate of 120 mm/s using an injection machine (TE150-IE3, WOOJIN Plaimm Co., Ltd.). A higher value of spiral flow length indicates better fluidity (moldability).

(5) Chemical resistance (oil resistance): A 3.2 mm thick specimen prepared in accordance with ASTM D638 is bent in a ¼ elliptical jig having a size of 12 cm×4 cm (length (a)×width (b)) to be subjected to stress, followed by application of a cooking oil and a kitchen cleaner (Magic Clean, KAO Corporation) to a surface of the specimen, and then whether the specimen has cracks is checked after 72 hours.

◯: Generation of cracks on specimen x: Generation of no cracks on specimen

TABLE 1

|  |  | Example | | | | | |
|---|---|---|---|---|---|---|---|
|  |  | 1 | 2 | 3 | 4 | 5 | 6 |
| (A) | (A1) | 20 | 30 | 40 | 30 | 30 | 30 |
| (wt %) | (A2) | 80 | 70 | 60 | 70 | 70 | 70 |
|  | (A3) | — | — | — | — | — | — |
| (B) | (B1) | 15 | 15 | 15 | 10 | 20 | 15 |
| (parts by weight) | (B2) | — | — | — | — | — | — |
| (C) (parts by weight) |  | 30 | 30 | 30 | 30 | 30 | 30 |
| (D) (parts by weight) |  | 30 | 30 | 30 | 30 | 30 | 30 |
| (E) (parts by weight) |  | — | — | — | — | — | 5 |
| Notched Izod strength (kgf · cm/cm) |  | 65 | 60 | 55 | 45 | 60 | 60 |
| Flame retardancy |  | 5VB | 5VB | 5VB | 5VB | 5VB | 5VB |
| VST (° C.) |  | 95 | 95 | 95 | 95 | 95 | 95 |
| Spiral flow length (mm) |  | 205 | 195 | 185 | 198 | 192 | 200 |
| Chemical resistance |  | ◯ | ◯ | ◯ | ◯ | ◯ | ◯ |

*Parts by weight: relative to 100 parts by weight of the polycarbonate resin (A)

TABLE 2

|  |  | Comparative Example |  |  |  |  |  |
|---|---|---|---|---|---|---|---|
|  |  | 1 | 2 | 3 | 4 | 5 | 6 |
| (A) (wt %) | (A1) | — | 30 | — | 30 | 30 | 30 |
|  | (A2) | — | — | 70 | 70 | 70 | 70 |
|  | (A3) | 100 | 70 | 30 | — | — | — |
| (B) (parts by weight) | (B1) | 15 | 15 | 15 | 0.5 | 35 | — |
|  | (B2) | — | — | — | — | — | 15 |
| (C) (parts by weight) | | 30 | 30 | 30 | 30 | 30 | 30 |
| (D) (parts by weight) | | 30 | 30 | 30 | 30 | 30 | 30 |
| (E) (parts by weight) | | — | — | — | — | — | — |
| Notched Izod strength (kgf · cm/cm) | | 60 | 65 | 55 | 9 | 70 | 60 |
| Flame retardancy | | Fail | 5VB | Fail | 5VB | Fail | Fail |
| VST (° C.) | | 93 | 95 | 93 | 98 | 92 | 95 |
| Spiral flow length (mm) | | 180 | 145 | 205 | 198 | 185 | 194 |
| Chemical resistance | | x | ○ | x | x | ○ | x |

* Parts by weight: relative to 100 parts by weight of the polycarbonate resin (A).

From the results shown in Tables 1 and 2, it can be seen that the thermoplastic resin composition according to the present invention have good properties in terms of chemical resistance, impact resistance, flame retardancy, heat resistance, and fluidity.

Conversely, the thermoplastic resin composition of Comparative Example 1, in which one polycarbonate resin (polycarbonate resin (A3)) is used instead of two types of polycarbonate resins (polycarbonate resins (A1) and (A2)) having different weight average molecular weights, has poor properties in terms of flame retardancy and chemical resistance. In addition, the thermoplastic resin composition of Comparative Example 2, in which the polycarbonate resin (A3) having a weight average molecular weight outside the range set forth herein is used instead of the second polycarbonate resin (A2) according to the present invention, has poor fluidity, and the thermoplastic resin composition of Comparative Example 3, in which the polycarbonate resin (A3) having a weight average molecular weight outside the range set forth herein is used instead of the first polycarbonate resin (A1) according to the present invention, has poor properties in terms of chemical resistance and flame retardancy. Further, the thermoplastic resin composition of Comparative Example 4, in which the amount of the core-shell type rubber-modified vinyl graft copolymer is below the range set forth herein, has poor properties in terms of impact resistance and chemical resistance, and the thermoplastic resin composition of Comparative Example 5, in which the amount of the core-shell type rubber-modified vinyl graft copolymer is above the range set forth herein, has poor flame retardancy. Moreover, the thermoplastic resin composition of Comparative Example 6, in which g-ABS is used instead of the core-shell type rubber-modified vinyl graft copolymer according to the present invention, has poor properties in terms of flame retardancy and chemical resistance.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 100 parts by weight of a polycarbonate resin;
   about 1 part by weight to about 30 parts by weight of a core-shell type rubber-modified vinyl graft copolymer;
   about 5 parts by weight to about 50 parts by weight of an aromatic vinyl copolymer resin;
   about 5 parts by weight to about 50 parts by weight of a phosphorus flame retardant; and
   about 0.1 parts by weight to about 30 parts by weight of a polyester resin,
   wherein the polycarbonate resin comprises a first polycarbonate resin having a weight average molecular weight of about 10,000 g/mol to about 30,000 g/mol and a second polycarbonate resin having a weight average molecular weight of about 35,000 g/mol to about 60,000 g/mol, and
   the core-shell type rubber-modified vinyl graft copolymer is obtained by grafting an alkyl (meth)acrylate monomer to a butadiene/ethyl acrylate rubber,
   wherein the thermoplastic resin composition has a notched Izod impact strength of about 60 kgf·cm/cm to about 70 kgf·cm/cm, as measured on a ⅛" thick specimen in accordance with ASTM D256, and
   wherein the thermoplastic resin composition has a spiral flow length of about 160 mm to about 250 mm, as measured on a specimen prepared by subjecting the thermoplastic resin composition to injection molding in a 2 mm thick spiral mold under conditions of a molding temperature of 300° C., a mold temperature of 80° C., an injection pressure of 1,500 kg/cm$^2$, and an injection rate of 120 mm/s.

2. The thermoplastic resin composition according to claim 1, wherein the polycarbonate resin comprises about 10 wt % to about 90 wt % of the first polycarbonate resin and about 10 wt % to about 90 wt % of the second polycarbonate resin.

3. The thermoplastic resin composition according to claim 1, wherein the core-shell type rubber-modified vinyl graft copolymer is obtained by grafting a monomer mixture comprising the alkyl (meth)acrylate monomer and an aromatic vinyl monomer to the rubber polymer.

4. The thermoplastic resin composition according to claim 1, wherein the aromatic vinyl copolymer resin is a polymer of a monomer mixture comprising an aromatic vinyl monomer and a vinyl cyanide monomer.

5. The thermoplastic resin composition according to claim 1, wherein the aromatic vinyl copolymer resin has a weight average molecular weight of about 10,000 g/mol to about 300,000 g/mol.

6. The thermoplastic resin composition according to claim 1, wherein the phosphorus flame retardant comprises a phosphate compound, a phosphonate compound, a phosphinate compound, a phosphine oxide compound, and/or a phosphazene compound.

7. The thermoplastic resin composition according to claim 1, wherein the thermoplastic resin composition has a flame retardancy of 5VB, as measured on a 1.5 mm thick specimen by the UL-94 vertical burning test.

8. The thermoplastic resin composition according to claim 1, wherein the thermoplastic resin composition has a Vicat softening temperature of about 90° C. to about 120° C., as measured at a heating rate of 50° C./hr under a load of 5 kg in accordance with ISO R306.

9. A molded article formed of the thermoplastic resin composition according to claim 1.

* * * * *